(12) United States Patent
Li

(10) Patent No.: US 8,063,614 B2
(45) Date of Patent: Nov. 22, 2011

(54) SYSTEM FOR ACTUATING PORTABLE ELECTRONIC DEVICES

(75) Inventor: Jun Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 695 days.

(21) Appl. No.: 12/203,230

(22) Filed: Sep. 3, 2008

(65) Prior Publication Data

US 2009/0284244 A1    Nov. 19, 2009

(30) Foreign Application Priority Data

May 19, 2008    (CN) .......................... 2008 1 0301623

(51) Int. Cl.
*G05F 1/00*    (2006.01)

(52) U.S. Cl. ............. 323/222; 323/282; 439/43; 439/54

(58) Field of Classification Search .................. 323/222, 323/271, 282, 283; 439/43, 54, 620.15, 620.25
See application file for complete search history.

(56) References Cited

U.S. PATENT DOCUMENTS

| 5,920,472 | A | * | 7/1999 | Bijlenga et al. | 363/97 |
| 7,560,898 | B1 | * | 7/2009 | Kranzen et al. | 320/107 |
| 2008/0215765 | A1 | * | 9/2008 | Butler et al. | 710/15 |

* cited by examiner

*Primary Examiner* — Adolf Berhane
*Assistant Examiner* — Nguyen Tran
(74) *Attorney, Agent, or Firm* — Altis Law Group, Inc.

(57) ABSTRACT

A system for actuating portable electronic devices includes a power supply circuit for providing an electric potential, a regulating circuit connected to the power supply circuit for regulating the electric potential provided by the power supply circuit, and an actuating circuit connected to the power supply circuit via the regulating circuit. The actuating circuit creating pulse signals to control the regulating circuit and the power supply circuit to create an actuating electric potential, which actuates portable electronic devices connected to the system.

7 Claims, 1 Drawing Sheet

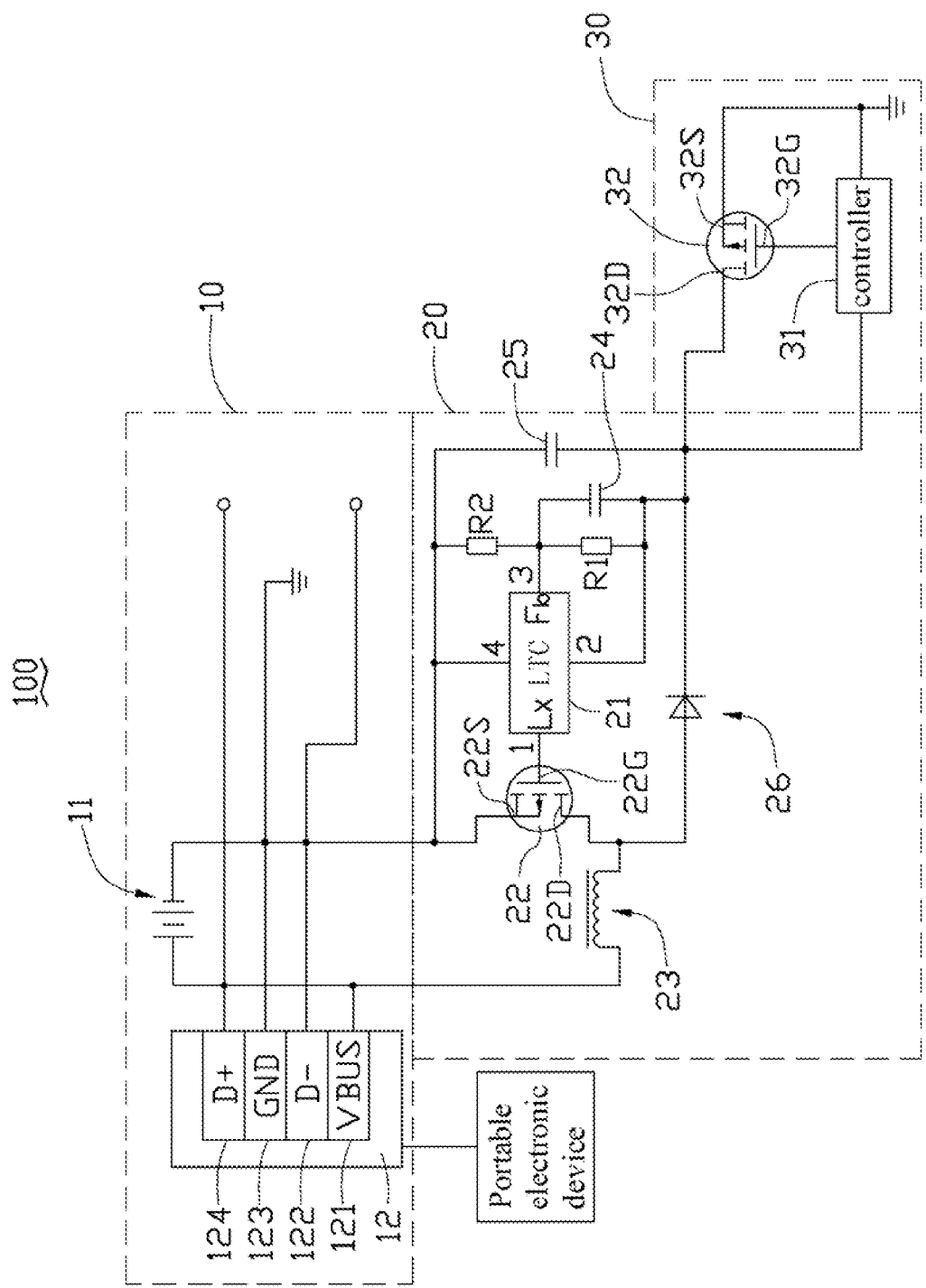

SYSTEM FOR ACTUATING PORTABLE ELECTRONIC DEVICES

BACKGROUND OF THE INVENTION

1. Field of the Invention

The present invention relates to actuation, and particularly to actuating portable electronic devices.

2. Description of Related Art

In the manufacture of portable electronic devices, these electronic devices are generally required to be connected to a power supply and be actuated for quality purposes. However, in modern manufacturing processes, there are usually a great number of portable electronic devices that are required to be tested. It may cost much time to manually connect these portable electronic devices to power supplies and actuate all of them.

Some portable electronic devices comprise testing power supplies. When a portable electronic device is fixed in a testing apparatus, the portable electronic device is connected to a power supply for supplying power to the portable electronic device during the test. However, the portable electronic devices still need to be manually actuated for testing. Thus, testing and actuating portable electronic devices is time consuming.

Therefore, an improved system for actuating portable electronic devices is desired in order to overcome the above-described shortcomings.

BRIEF DESCRIPTION OF THE DRAWINGS

Many aspects of the present actuating device can be better understood with reference to the following drawings. The components in the various drawings are not necessarily drawn to scale, the emphasis instead being placed upon clearly illustrating the principles of the present actuating device. Moreover, in the drawing, like reference numerals designate corresponding parts throughout the diagrams, in which:

The drawing is a circuit diagram of an actuating device according to one embodiment of the present disclosure.

DETAILED DESCRIPTION

Referring to FIG. 1, an actuating device 100 according to one embodiment of the present disclosure is shown. The actuating device 100 may be used in quality testing of portable electronic devices, such as mobile phones, to provide electric power to the electronic devices during a test and actuate a portable electronic device electronically connected to the actuating device 100.

In one embodiment, the actuating device 100 includes a power supply circuit 10, a regulating circuit 20 and an actuating circuit 30. The power supply circuit 10 can provide electric power to a portable electronic device connected to the actuating device 100. The regulating circuit 20 is electronically connected to the power supply circuit 10 to regulate an electric potential of the power supply circuit 10 in a predetermined range.

The actuating circuit 30 is electronically connected to the regulating circuit 20, and generates and sends pulse signals to the regulating circuit 20. The pulse signals control the regulating circuit 20 and the power supply circuit 10 to create an actuating electric potential. The actuating potential actuates portable electronic devices connected to the actuating device 100. After the portable electronic device is actuated, the actuating circuit 30 can also stop sending the pulse signals to the regulating circuit 20, thus the actuating electric potential is removed without interfering test of the portable electronic device.

The power supply circuit 10 includes a direct current (DC) power supply 11, such as a battery or a receptacle for providing an electric potential, and an interface 12 for connecting to portable electronic devices. The interface 12 has a power supply connector (VBUS) 121, a low potential signal connector (D−) 122, a high potential signal connector (D+) 123, and a grounding connector (GND) 124. These connectors are configured similarly to that of conventional Universal Serial Bus (USB) interfaces, thus a USB interface can be used as the interface 12. An anode of the DC power supply 11 is connected to the power supply connector 121 and the high potential signal connector 124 for providing electric potential to portable electronic devices connected to the interface 12 for testing purposes. A cathode of the DC power supply 11 is connected to the low potential signal connectors 122 and the grounding connector 124. The low potential signal connector 122 can be connected to inner circuits of the portable electronics devices connected to the interface 12 for identifying these portable electronics devices. The grounding connector 124 provides a grounding route.

The regulating circuit 20 includes a regulator 21, a first amplifier 22, an inductor 23, a first capacitor 24, a second capacitor 25, a diode 26 and a plurality of resistors. The regulator 21 is an LTC chip configured for creating an even pulse electric potential according to electric signals inputted therein. The regulator 21 includes a regulating connector 1, an outputting connector 2, an inputting connector 3 and a grounding connector 4. The first amplifier 22 is a metal-oxide-semiconductor field-effect-transistor (MOSFET). A gate 22G of the first amplifier 22 is connected to the regulating connector 1, a source 22S of the first amplifier 22 is grounded, and a drain 22D of the first amplifier 22 is connected to an anode of the diode 26. The inductor 23 has one end connected to the drain 22D of the first amplifier 22 and another end connected to an anode of the DC power supply 11.

In one exemplary embodiment of the present disclosure, the first capacitor 24 has a capacitance of 1 μF, and the second capacitor 25 has a capacitance of 47 μF. The first capacitor 24 is connected to a first resistor R1 in a parallel connection, one pole of the first capacitor 24 is connected to the inputting connector 2 and a cathode of the diode 26, and another pole of the first capacitor 24 is connected to the outputting connector 3. One pole of the second capacitor 25 is connected to the inputting connector 2 and the cathode of the diode 26, and another pole of the second capacitor 25 is connected to the outputting connector 3 via a second resistor R2 in series. In this way, the diode 26, the first capacitor 24, the second capacitor 25 and the resistors together form a reactive circuit (not labeled). The grounding connector 4 provides a grounding route.

The actuating circuit 30 includes a controller 31 and a second amplifier 32. The controller 31 is a single chip for generating pulse signals, which are processed by the regulating circuit 20 to form an actuating electric potential for actuating portable electronic devices connected to the interface 12. Actuating conditions and lasting time of the pulse signals are also set in the controller 31. The controller 31 includes a grounding route (not labeled), and is electronically connected to a cathode of the diode 26. Thus, the controller 31 receives working electric potential provided by the power supply circuit 10 in use, without any additional power supplies.

The second amplifier 32 is a MOFSET. A gate 32G of the second amplifier 32 is connected to the controller 31. A source 32S of the second amplifier 32 is grounded. A drain 32D is connected to a cathode of the diode 26, and also connected to the poles of the first capacitor 24 and the second capacitor 25 which are connected to the cathode of the diode 26. Thus, the drain 32D is further connected to the outputting connector 3 via the first capacitor 24 and the second capacitor 25.

In use, a portable electronic device to be tested (not shown), such as a mobile phone, can be electronically connected to the actuating device 100 via the interface 12. The DC power supply 11 provides a testing electric potential to the portable electronic device via the power supply connector 121 of the interface 12. The regulating circuit 20 regulates the electric potential of the power supply connector 121 in a predetermined range via the regulator 21 and said reactive circuit. At the same time, the electric potential of the DC power supply 11 also turns on the diode 26, and passes through the inductor 23 and the diode 26 to be inputted to the controller 31. Thus, the controller 31 receives working electric potential provided by the power supply circuit 10.

The controller 31 and the interface 12 can be connected to a data processor, such as a computer. Thus, a user can operate the actuating device 100 via the data processor and the controller 31, and can also identify the portable electronic device connected to the surface 12 via the low potential signal connector 122 connected to inner circuits of the portable electronic devices. If the portable electronic device achieves actuating conditions predetermined in the controller 31, the controller 31 can be operated to create pulse signals. The operation on the portable electronics devices can be manually performed by the user or performed by the data processor. Understandably, said operation of receiving data of portable electronic devices can also be omitted, correspondingly, the controller 31 is set to create pulse signals when any kind of portable electronic device is connected to the interface 12.

The pulse signals are transferred to the second amplifier 32, which are amplified by the second amplifier 32 and outputted from the drain 32D of the second amplifier 32. The amplified signals outputted from the drain 32D are regulated by the first capacitor 24 and the second capacitor 25, and then inputted into the inputting connector 3 of the regulator 21. The regulator 21 regulates the pulse signals to form even square pulse signals, and outputs the square pulse signals from the regulating connector 1.

The square pulse signals outputted from the regulator 21 are amplified by the first amplifier 22, and the amplified square pulse signals are outputted from the drain 22D as actuating pulses. The actuating pulses are insulated by the inductor 23 and pass through the diode 26. In this way, the inductor 23 acts as a pull-up resistor to increase an electric potential of the power supply connector 121 and the high electric potential 124 to a predetermined actuating electric potential. Thus, the portable electronic device connected to the interface 12 is actuated.

When the diode 26 is conducted, the pulse signals outputted from the first amplifier 22 pass through said reactive circuit formed by the diode 26, the first capacitor 24, the second capacitor 25 and the resistors, and returns to the inputting connector 3 of the regulator 21 to form a reactive circuit. Thus, said actuating electric potential can be regulated in a predetermined range. Furthermore, since the actuating circuit 30 is connected to a cathode of the diode 26, the diode 26 can prevent the pulse signals directly outputted by the second amplifier 32 from entering the power supply circuit 10.

A lasting time of the actuating pulse signals can be set in the controller 31. In use, the controller 31 can stop creating the pulse signals according to the predetermined lasting time. Thus, reduces the power consumption of the actuating device 100, and the testing electric potential of the portable electronic device is more stabilized.

The actuating device 100 of the present disclosure provides testing electric potential to portable electronic devices connected to the actuating device 100, for actuating the portable electronic devices. Thus, processes of manually turning the portable electronic devices can be omitted, and an efficiency of testing the portable electronic devices is increased.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system for actuating a portable electronic device, comprising:

a power supply circuit for providing a testing electric potential to the portable electronic device; the power supply circuit including a direct current (DC) power supply and an interface for connecting the portable electronic device, the interface including a power supply connector, a low potential signal connector, and a high potential signal connector; an anode of the DC power supply connected to the power supply connector and the high potential signal connector;

a regulating circuit connected to the power supply circuit for regulating the testing electric potential provided by the power supply circuit; the regulating circuit including a regulator, a first amplifier, an inductor, a diode, a plurality of capacitors, and a plurality of resistors; the regulator being a chip including a regulating connector, an outputting connector, and an inputting connector; the first amplifier being a metal-oxide-semiconductor-field effect-transistor (MOFSET) including a gate, a source and a drain; the gate connected to the regulating connector, the source grounded, the drain connected to the anode of the diode; the inductor having one end connected to the drain and another end connected to an anode of the DC power supply; and an actuating circuit connected to the power supply circuit via the regulating circuit, the actuating circuit creating pulse signals to control the regulating circuit and the power supply circuit to create an actuating electric potential for actuating the portable electronic device; wherein the regulator and the first amplifier process the pulse signals to create actuating signals, the actuating signals cooperate with the inductor to increase an electric potential of the power supply connector and the high potential signal connector to the actuating electric potential, and the capacitors and the resistors are connected to the diode to form a reactive circuit for regulating the testing electric potential and the actuating electric potential.

2. The system as claimed in claim 1, wherein a cathode of the DC power supply is connected to the low potential signal connector, and the system identifies the portable electronics device connected to the interface via the low potential signal connector.

3. The system as claimed in claim 1, wherein the actuating circuit includes a controller for creating pulse signals to control the regulating circuit and the power supply circuit to create the actuating electric potential, the controller connected to a cathode of the diode to get the testing electric potential provided by the power supply circuit.

4. The system as claimed in claim 3, wherein the regulating circuit includes a first capacitor and a second capacitor; the first capacitor connected to a resistor in a parallel connection, one pole of the first capacitor connected to the inputting connector and a cathode of the diode, and another pole of the first capacitor connected to the outputting connector; one pole of the second capacitor connected to the inputting connector and the cathode of the diode, and another pole of the second capacitor connected to the outputting connector via a resistor in series.

5. The system as claimed in claim 4, wherein the actuating circuit includes a second amplifier including a gate, a source and a drain; the gate connected to the controller, the source grounded, the drain connected to the cathode of the diode.

6. The system as claimed in claim 5, wherein the drain of the second amplifier is also connected to the poles of the first capacitor and the second capacitor which are connected to the cathode of the diode, thus is further connected to the outputting connector of the regulator via the first capacitor and the second capacitor.

7. The system as claimed in claim 5, wherein the second amplifier is a MOFSET.

* * * * *